Aug. 5, 1924.
C. F. ERICKSON
1,504,110
RESILIENT WHEEL
Filed Feb. 11, 1922
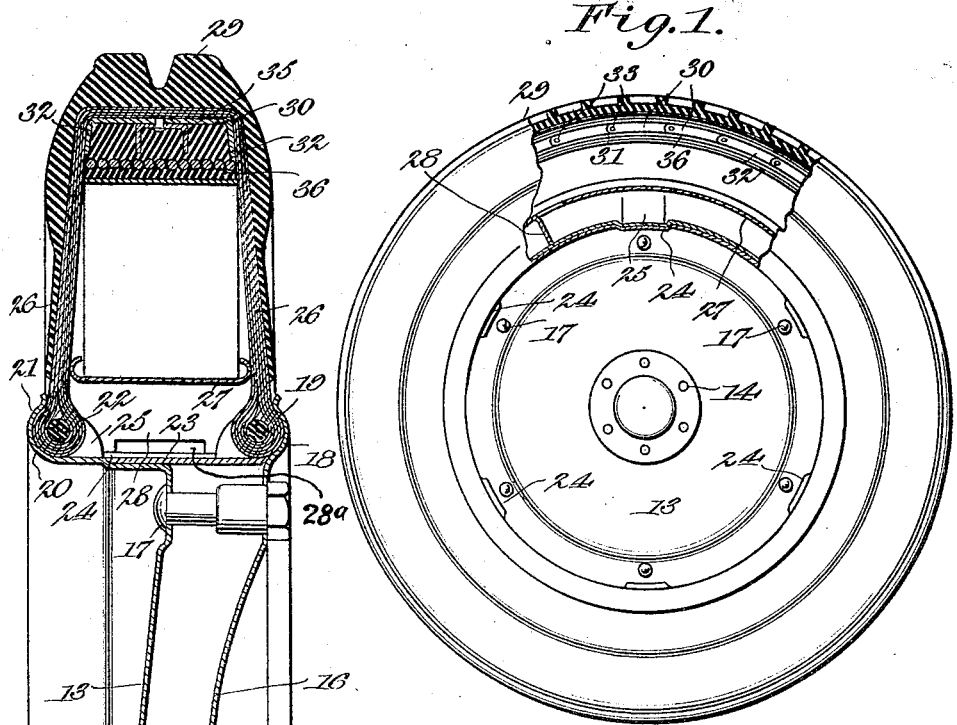
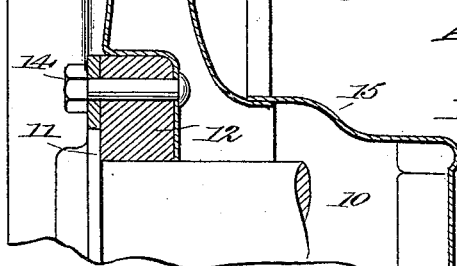
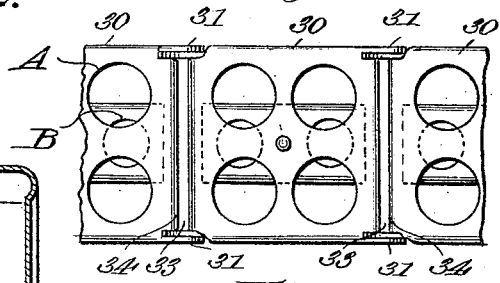
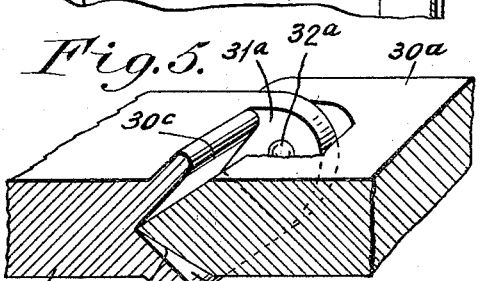
Charles F. Erickson
INVENTOR
BY Victor J. Evans
ATTORNEY
WITNESS: Fred W. Ely Patented Aug. 5, 1924.

1,504,110

UNITED STATES PATENT OFFICE.

CHARLES F. ERICKSON, OF BROOKLYN, NEW YORK.

RESILIENT WHEEL.

Application filed February 11, 1922. Serial No. 535,871.

*To all whom it may concern:*

Be it known that I, CHARLES F. ERICKSON, a subject of the King of Sweden, residing at Brooklyn, in the county of Kings and State of New York, have invented new and useful Improvements in Resilient Wheels, of which the following is a specification.

This invention relates to resilient wheels and one of the objects is to produce a wheel in which a spacing element shall be provided for holding the side walls of the tire member apart and in which bead gripping plates when drawn together will co-operate with the spacing element so as to cause the sides of the tire element to be straightened and drawn taut.

Another object is to produce a spacing element which shall be simple of construction and efficient in operation.

Another object is to provide novel and improved gripping and securing means.

Another object is to produce a device of this nature in which the tire supporting rim and spring shall be so constructed and positioned that the shocks received by the wheel shall not be received in the length of the grain of the steel, and the entire shock shall not be sustained by the spring, whereby crystalization of these parts will be prevented.

Another object is to produce a device of this nature in which the sole purpose of the spring or resilient device shall be to restore the supporting rim to normal condition.

Another object is to produce a device of this nature which shall be simple of construction, inexpensive to manufacture, and highly efficient for the purpose for which it is designed.

With these and other objects in view which will be apparent as the specification proceeds, the invention resides in certain novel construction and combination and arrangement of parts, the essential features of which are hereinafter fully described, are particularly pointed out in the appended claims and are illustrated in the accompanying drawing, in which:—

Figure 1, is a side elevation of my improved resilient wheel, parts being broken away for the sake of clearness.

Figure 2, is a vertical sectional view of the same.

Figure 3, is a detail plan view of a portion of the tire supporting rim.

Figure 4, is a vertical sectional view of the same.

Figure 5, is a sectional perspective view of a modified form of rim.

Like characters of reference refer to like parts in the several views.

Referring to the drawing in detail, it will be seen that there is a sleeve 10 which is meant to be rotatably mounted on the axle of the vehicle and the outer end of which is provided with a flange 11 carrying a block or seat 12 of any suitable material. An inner plate 13 is bolted to the flange 11 and block 12 as at 14. A cap member 15 embraces the central portion of the outer plate 16. The plates 13 and 16 are secured together by bolts or other suitable means as at 17.

The outer portion of plate 16 is formed into a bead receiving annular groove 18 adapted to receive the bead 19 of the tire. The periphery of plate 13 is bent laterally to form a flange 20 which is provided at its extremity with a vertically disposed portion 21 formed into a bead receiving element for receiving the bead 22 of the tire portion. Between the members 13 and 16 and slidable on the element 20 is a plate 23, the purpose of which is to receive certain lugs of the bead 19 to prevent creeping of the tire. The flange 20 and member 23 are provided with depressions 24 at intervals into which lugs 25 of the beads 19 and 22 respectively are adapted to fit, the coaction of such lugs and depressions preventing any possibility of the tire creeping. The sides 26 of the tire are spaced apart by an annular member 27 provided with a plurality of legs 28 which are seated on the elements 20 and 23. The legs 28 are formed with cut-out portions 28$^a$ to reduce the weight of said ring. The outer part of the tire may be provided with the usual rubber tread 29 of any suitable style. At the outer portion of the tire 26, there is provided a ring comprising a plurality of blocks 30 having ears 31 formed at the ends of side flanges 32, said ears being pierced and pivotally connected by pivot bolts or pins 33. The ends of the body portions of blocks 30 are bent into flanges 34, which are curved so as to fit about the pivot pins 33 and these flanges 34 limit the amount of movement permitted to each pair of blocks 30. A channel iron 35 is secured to the interior of each block forming strengthening ribs. Inside of the rim composed of the members 30 there is provided a spring element 36 which is coiled helically so as to fill up the space from side to side of said blocks 30 and in close proximity to the inner side thereof. Rubber is vulcanized about the ring 30 and around the coils of the spring 36 and also between the spring and the blocks 30.

It will be seen from the above description that the beads of the tire member are gripped by the annular grooves of the plates 13 and 16 and that upon drawing the two plates together by means of the bolts 17, the sides of the tire elements will be drawn taut as the annular member 27 prevents any inward movement of the sides, and the beads in being forced under said member 27, draw the sides 26 of the tire straight and tight, thereby drawing the tire and annular member into complete and intimate engagement.

The members 30 and 35 are perforated at A and B respectively so that when these members are moulded in the rubber tread of the tire, the rubber will flow into these perforations to firmly secure these members in position.

In the modified form shown in Figure 5, the blocks 30ª, are formed with one pointed end 30ᵇ, and a V-shaped notch 30ᶜ, in the other end. These blocks are provided with ears 31ª which are the same as ears 31 in the first embodiment of the invention. These ears may be pivotally connected together by bolts 32ª. When placed end to end, they permit of a considerable amount of resilience and at the same time form a compact and strong supporting means.

While I have herein fully shown and described and have pointed out in the appended claims certain novel features of construction, arrangement and operation which characterize my invention, it will be understood by those skilled in the art that various omissions, substitutions and changes in the forms, proportions, sizes, of the materials used, and of their operation, may be made without departing from the spirit of my invention.

What I claim as new is:—

1. A resilient wheel comprising a pair of plates, the periphery of each of which is formed into a bead gripping member, means securing said plates together, means supported by said plates for holding the walls of a tire in expanded condition, a tire including beads for co-operation with said plates and side walls for co-operation with the holding means, a ring mounted in said tire and comprising a plurality of pivotally connected blocks, a resilient means for holding said blocks in predetermined relationship.

2. A resilient wheel including a ring formed from a plurality of pivotally connected blocks, a resilient element in juxtaposition thereto, and a tire body in which said blocks and element are embedded.

3. A resilient wheel comprising a ring formed from a plurality of substantially identical blocks, each block formed with side and end flanges, and a tire body in which said ring is embedded.

4. A resilient wheel including a ring formed from a plurality of substantially identical blocks, pivotally connected, each of said blocks including side flanges forming bearings for pivot pins, and end flanges enclosing the pivot pins and forming stops for the purpose set forth.

5. A resilient wheel including a ring formed from a plurality of substantially identical blocks, each formed with marginal flanges, and an element secured to each of said blocks for stiffening the entire structure and reinforcing certain of said flanges.

6. A wheel structure comprising a pair of annular plates, means for adjusting the plates relatively, a tire having spaced side walls, respectively engaged by said plates, an annular member between said side walls and engaged thereagainst at points beyond the connection of said walls with said plates, and spacing devices upstruck from said member and resting against one of said plates and a ring to hold the annular member in a definite relation to the said side walls.

7. A resilient wheel structure comprising a pair of plates adjustably associated with each other and respectively terminating in peripheral portions having annular grooves, a tread member of elastic material, said tread member having side walls with beads seated in the respective grooves of the peripheral portions of the plates, an annular member located between said side walls and bearing thereagainst at points outwardly of said beads, a resilient ring constituting part of said tread; said annular member having upstruck legs bearing against the peripheral portions of one of the plates and an element interposed between said plates to definitely secure said annular member in fixed relation to the beads, and means for adjusting the plates to vary the pressure of the side walls against said annular member.

8. A structure of the class described comprising a tire body provided with a tread portion and a pair of side walls, beads formed on said walls, a spacing ring between said walls at points beyond and entirely out of engagement with the beads, means for drawing the walls against the sides of said ring, and a flexible ring embedded in the tread portion of said tire body.

9. A structure of the class described comprising a tire body having spaced side walls and a connecting tread, and a ring embedded in the tread and consisting of sections movably connected together.

In testimony whereof I have affixed my signature.

CHARLES F. ERICKSON.